March 19, 1963   W. J. HOGAN   3,081,679
RAPID FILM CHANGING DEVICE
Filed June 6, 1958   17 Sheets-Sheet 1

INVENTOR.
William J. Hogan,
BY Paul & Paul
ATTORNEYS.

March 19, 1963
W. J. HOGAN
3,081,679
RAPID FILM CHANGING DEVICE
Filed June 6, 1958
17 Sheets-Sheet 2
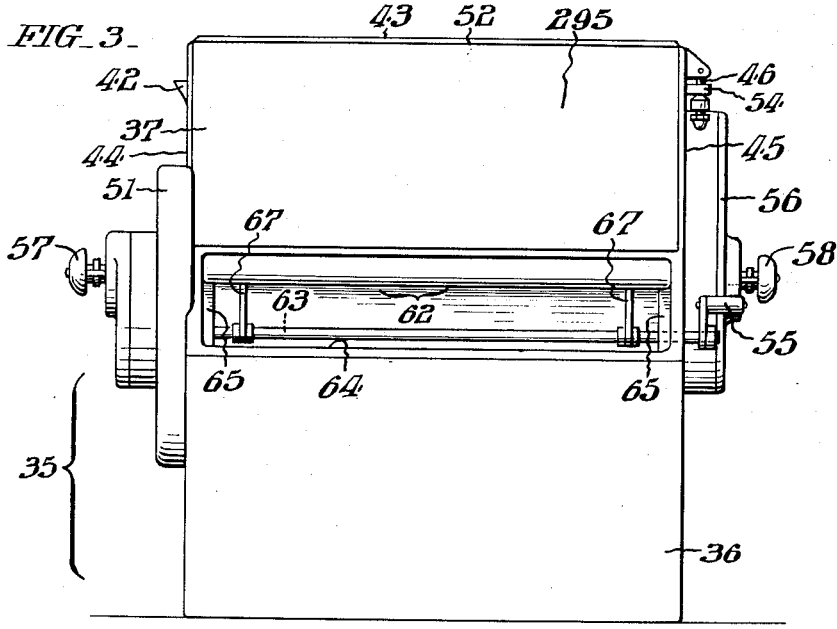
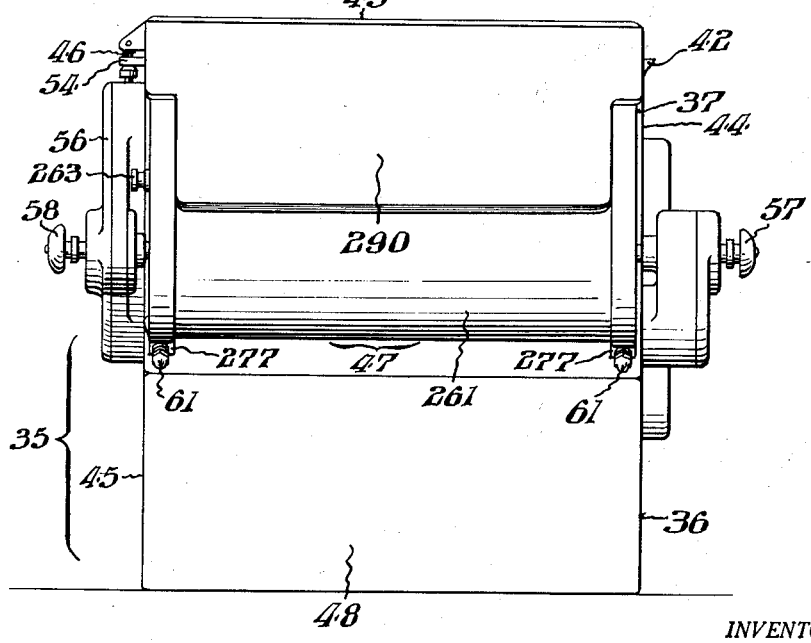
INVENTOR.
William J. Hogan,
BY Paul & Paul
ATTORNEYS.

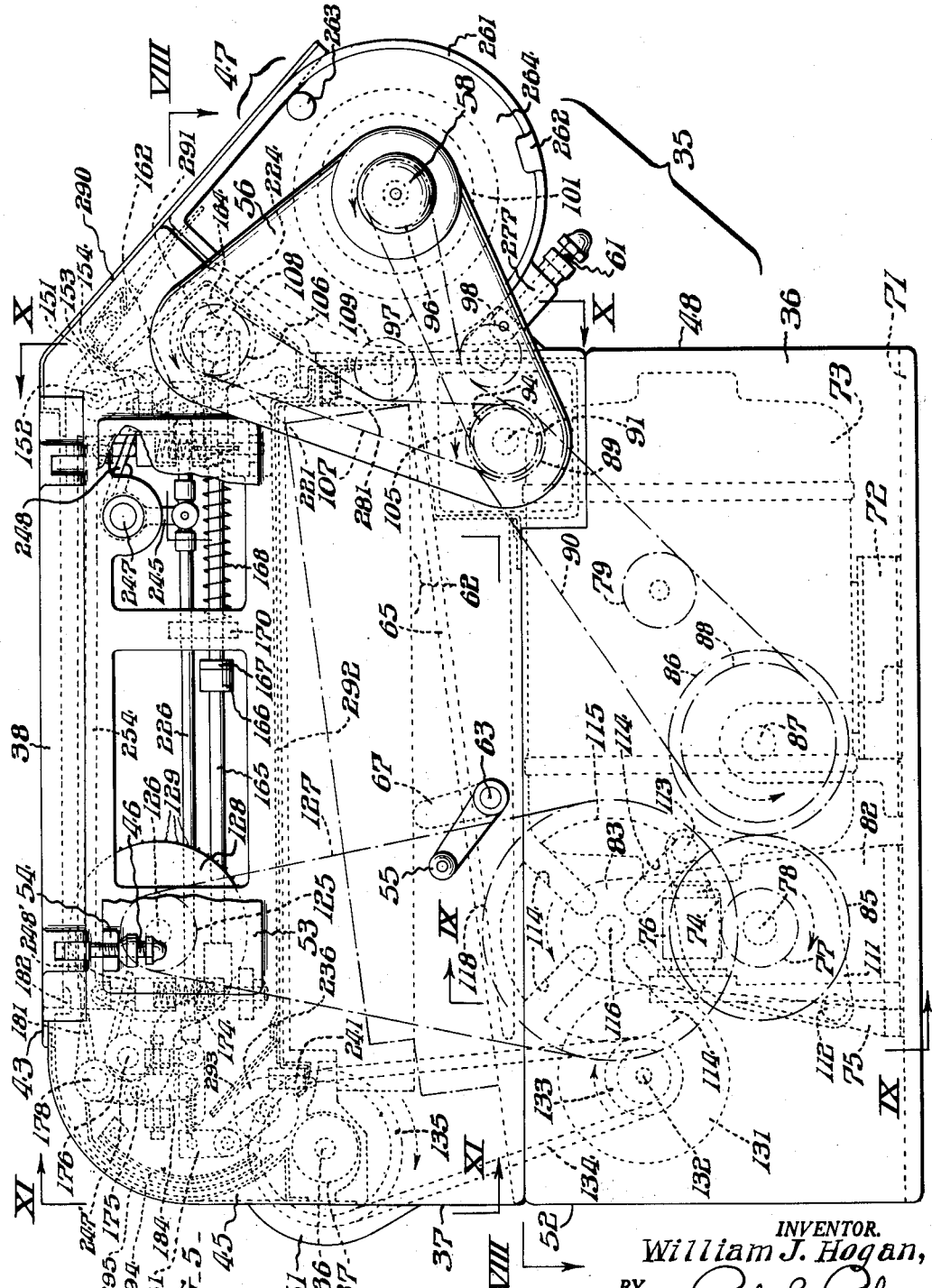

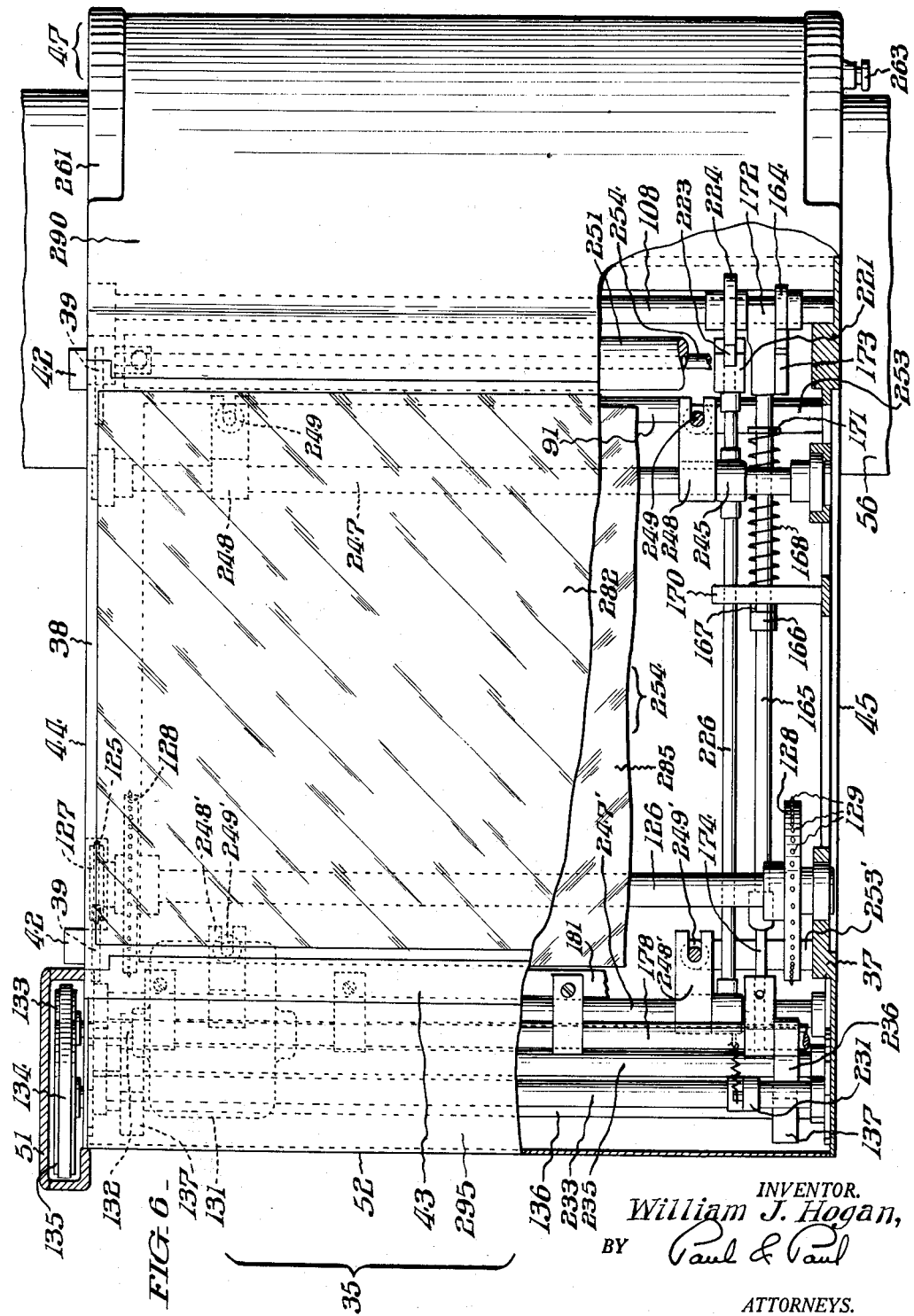

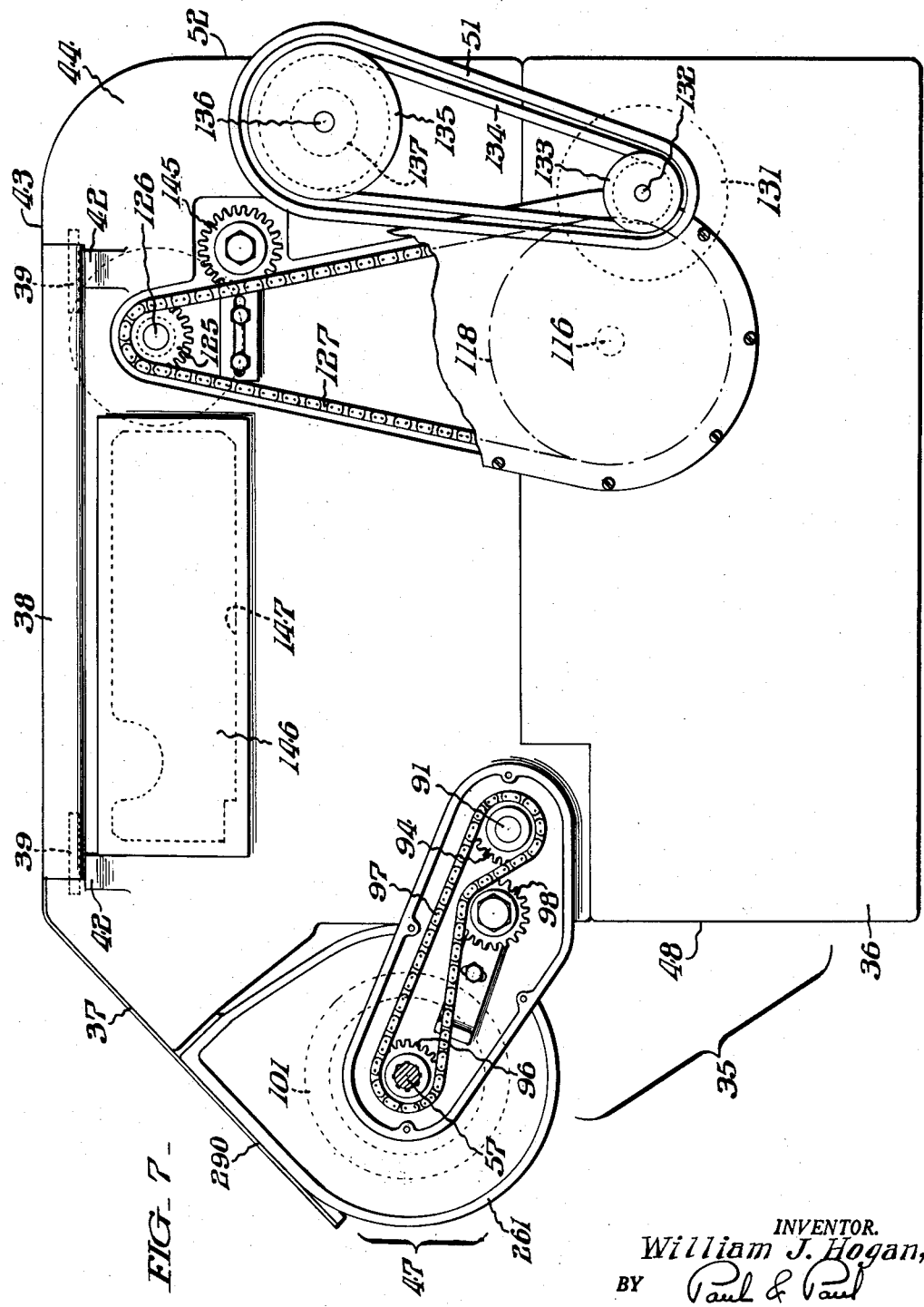

March 19, 1963

W. J. HOGAN 3,081,679

RAPID FILM CHANGING DEVICE

Filed June 6, 1958

INVENTOR.
William J. Hogan,
BY Paul & Paul
ATTORNEYS.

March 19, 1963 W. J. HOGAN 3,081,679
RAPID FILM CHANGING DEVICE
Filed June 6, 1958 17 Sheets-Sheet 7
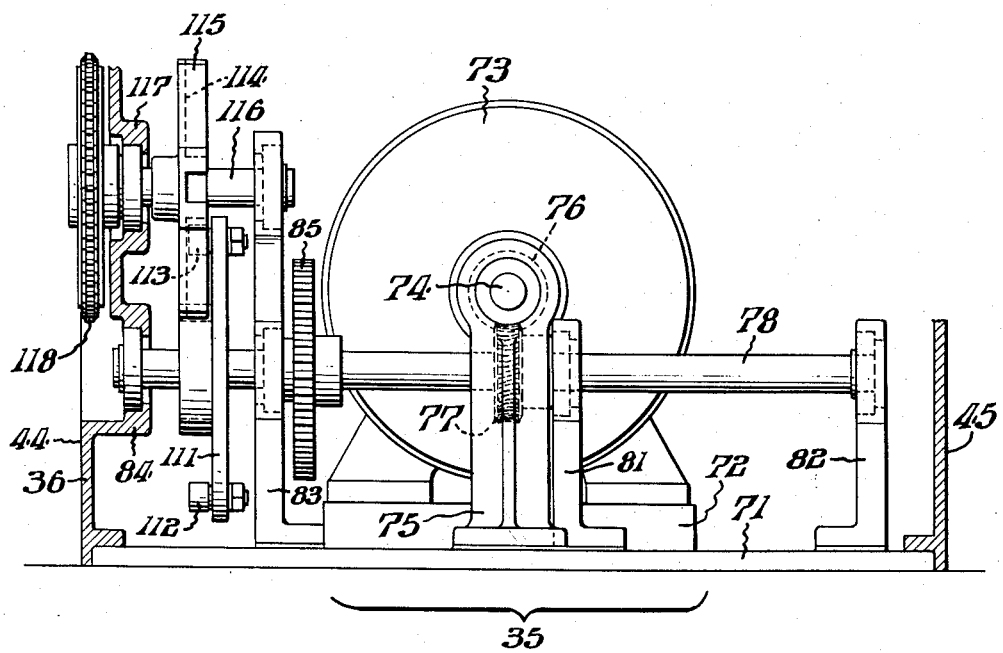
FIG_9_
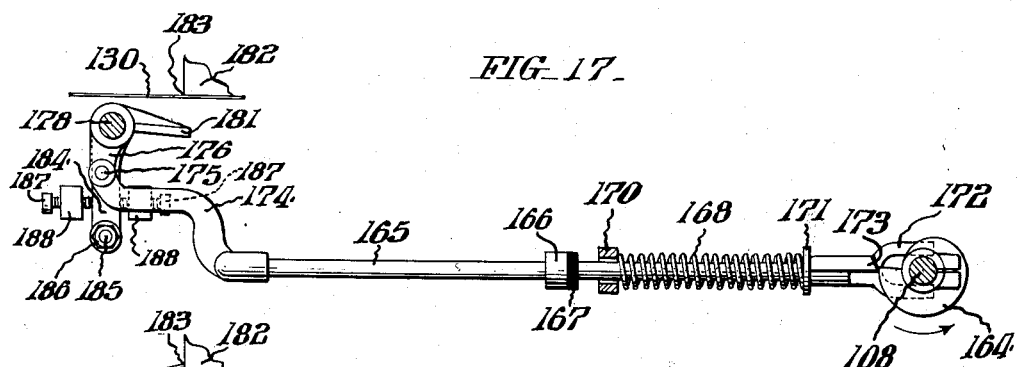
FIG_17_
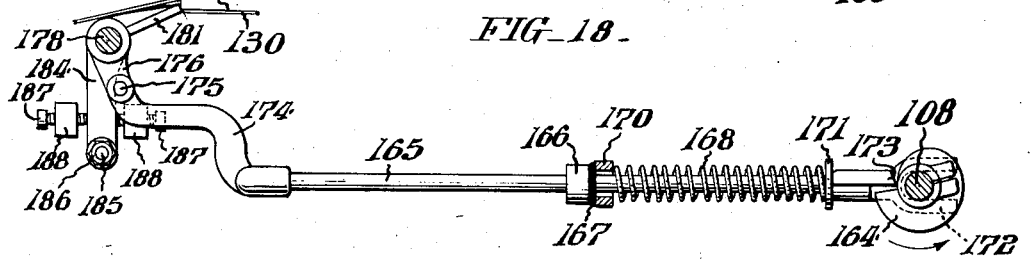
FIG_18_
INVENTOR.
William J. Hogan,
BY Paul & Paul
ATTORNEYS.

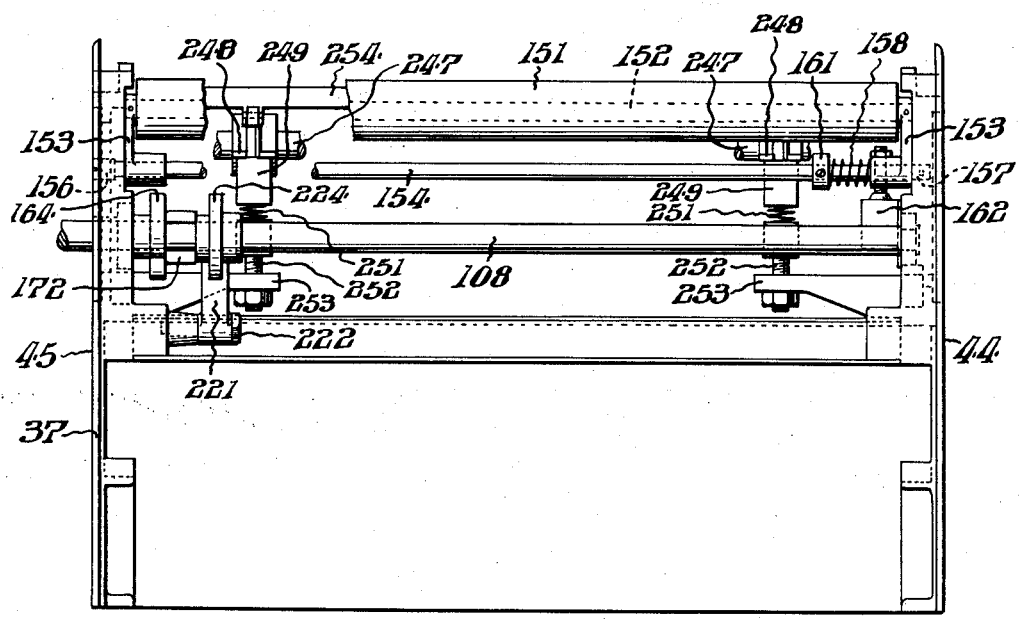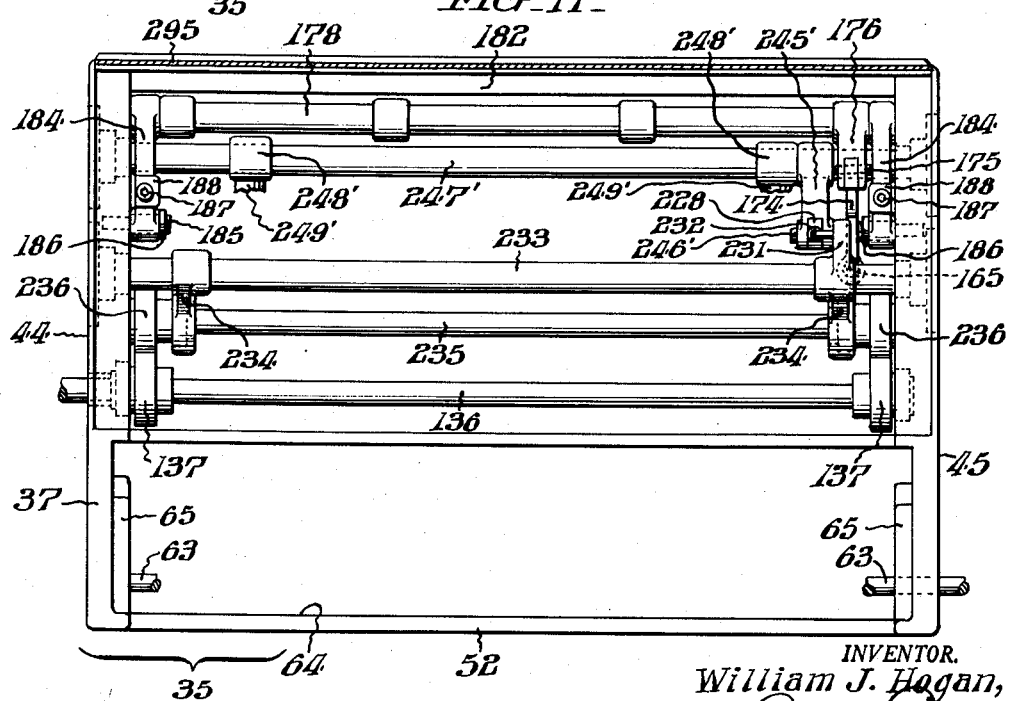

March 19, 1963 W. J. HOGAN 3,081,679
RAPID FILM CHANGING DEVICE
Filed June 6, 1958 17 Sheets-Sheet 9
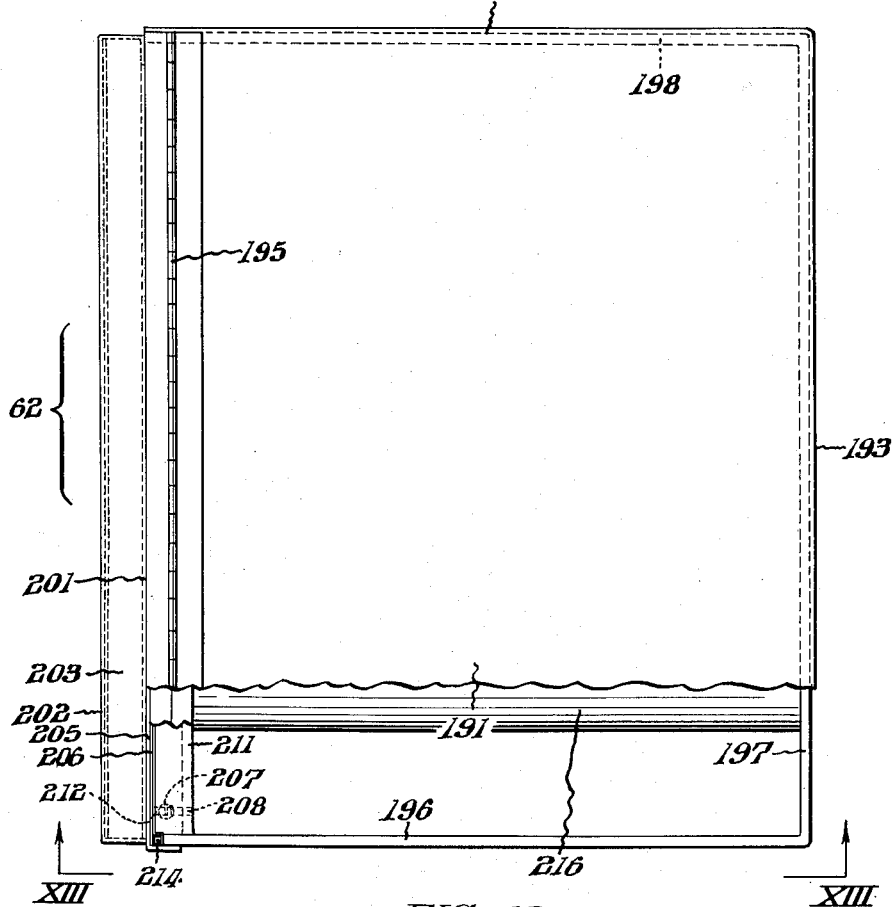
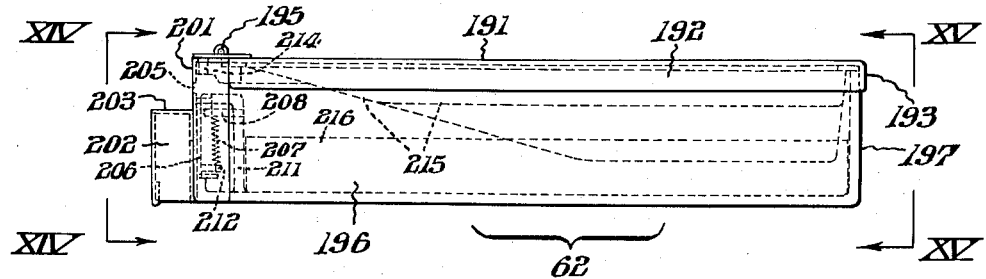
INVENTOR.
William J. Hogan,
BY Paul & Paul
ATTORNEYS.

March 19, 1963    W. J. HOGAN    3,081,679
RAPID FILM CHANGING DEVICE
Filed June 6, 1958    17 Sheets-Sheet 10
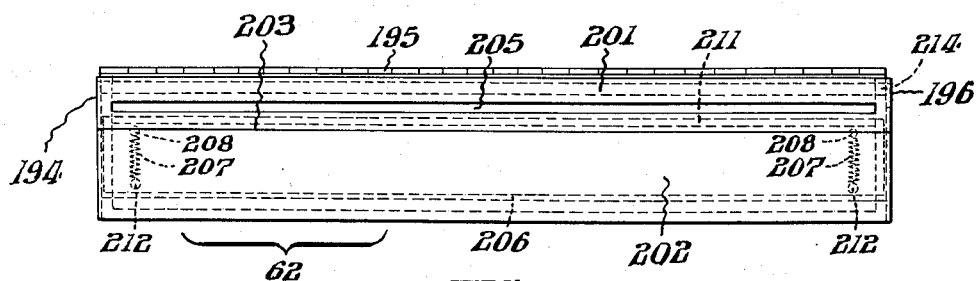
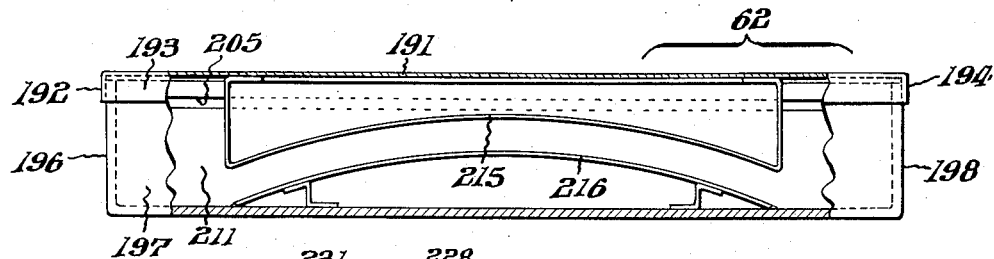
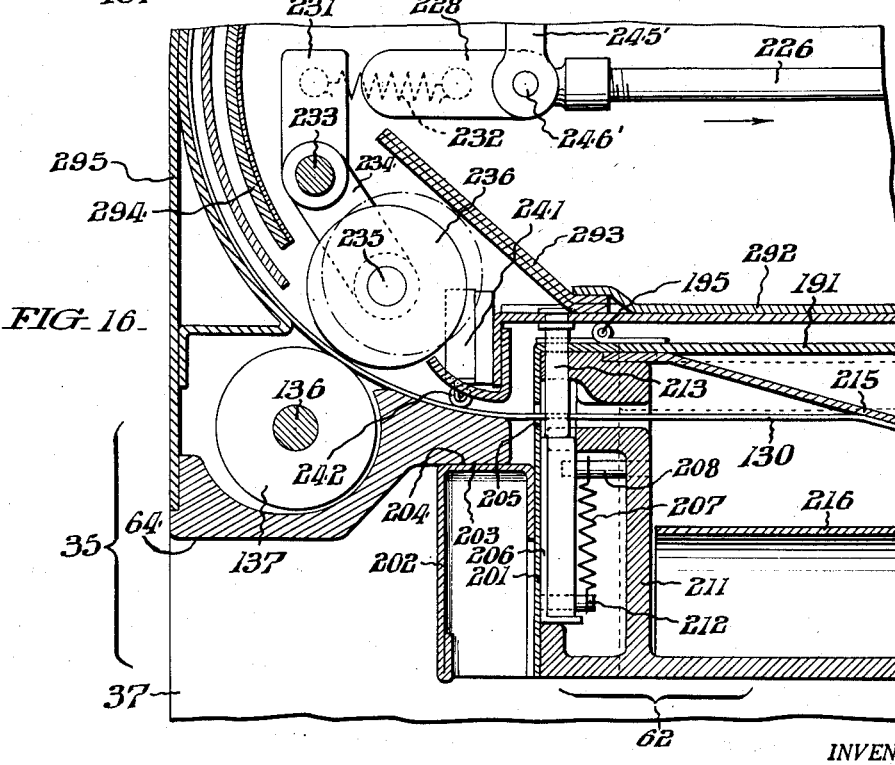
INVENTOR.
William J. Hogan,
BY Paul & Paul
ATTORNEYS.

March 19, 1963 W. J. HOGAN 3,081,679
RAPID FILM CHANGING DEVICE
Filed June 6, 1958 17 Sheets-Sheet 11
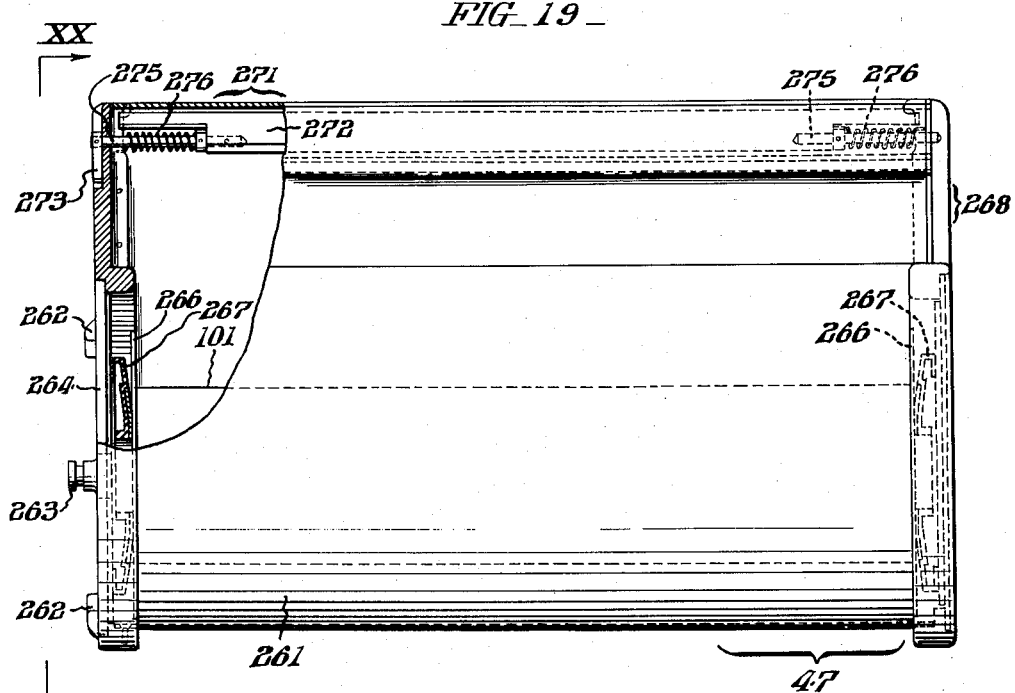
FIG_19_
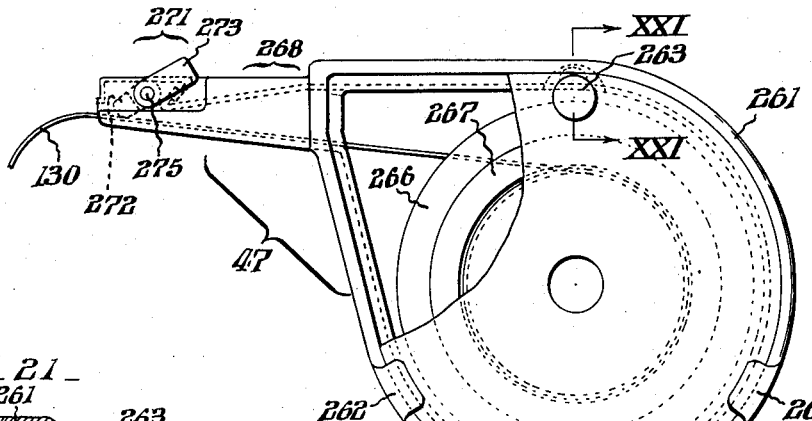
FIG_20_
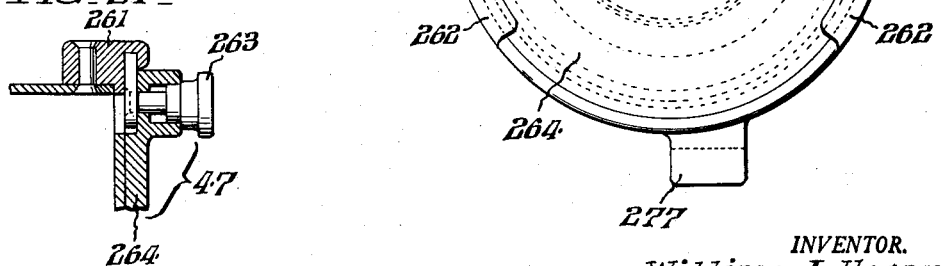
FIG_21_
INVENTOR.
William J. Hogan,
BY Paul & Paul
ATTORNEYS.

March 19, 1963 W. J. HOGAN 3,081,679
RAPID FILM CHANGING DEVICE
Filed June 6, 1958 17 Sheets-Sheet 12
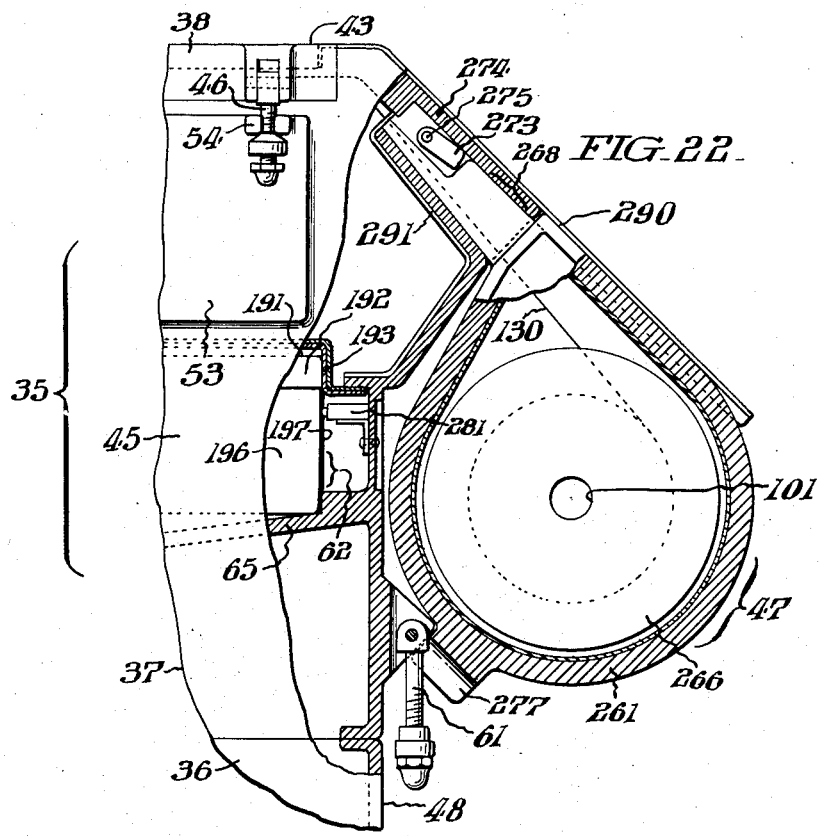
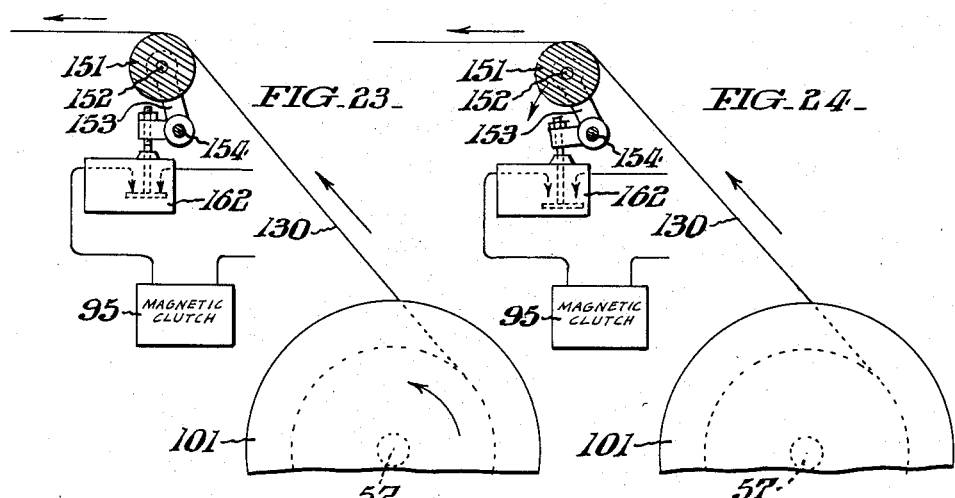
INVENTOR.
William J. Hogan,
BY Paul & Paul
ATTORNEYS.

March 19, 1963 W. J. HOGAN 3,081,679
RAPID FILM CHANGING DEVICE
Filed June 6, 1958 17 Sheets-Sheet 13
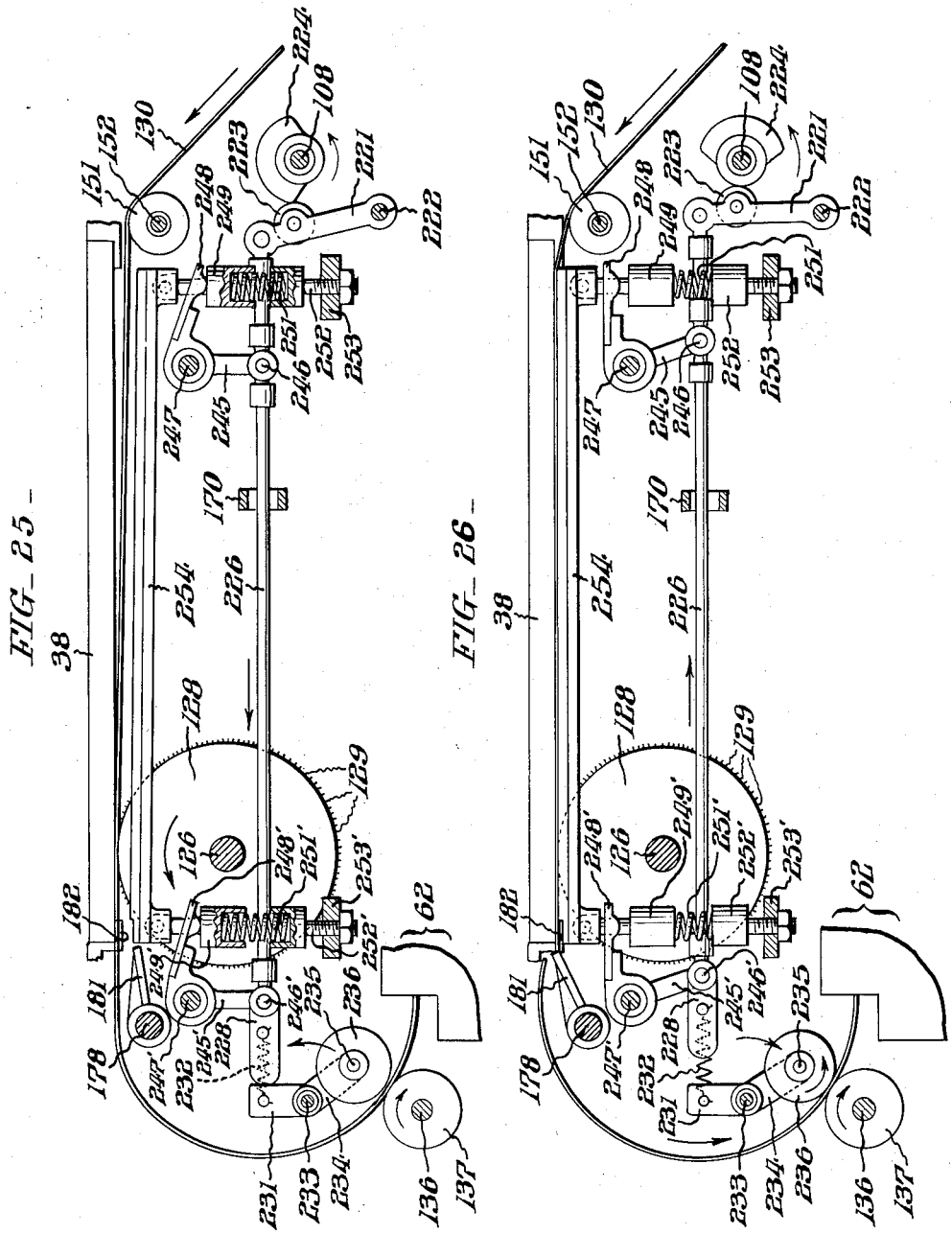
INVENTOR.
William J. Hogan,
BY Paul & Paul
ATTORNEYS.

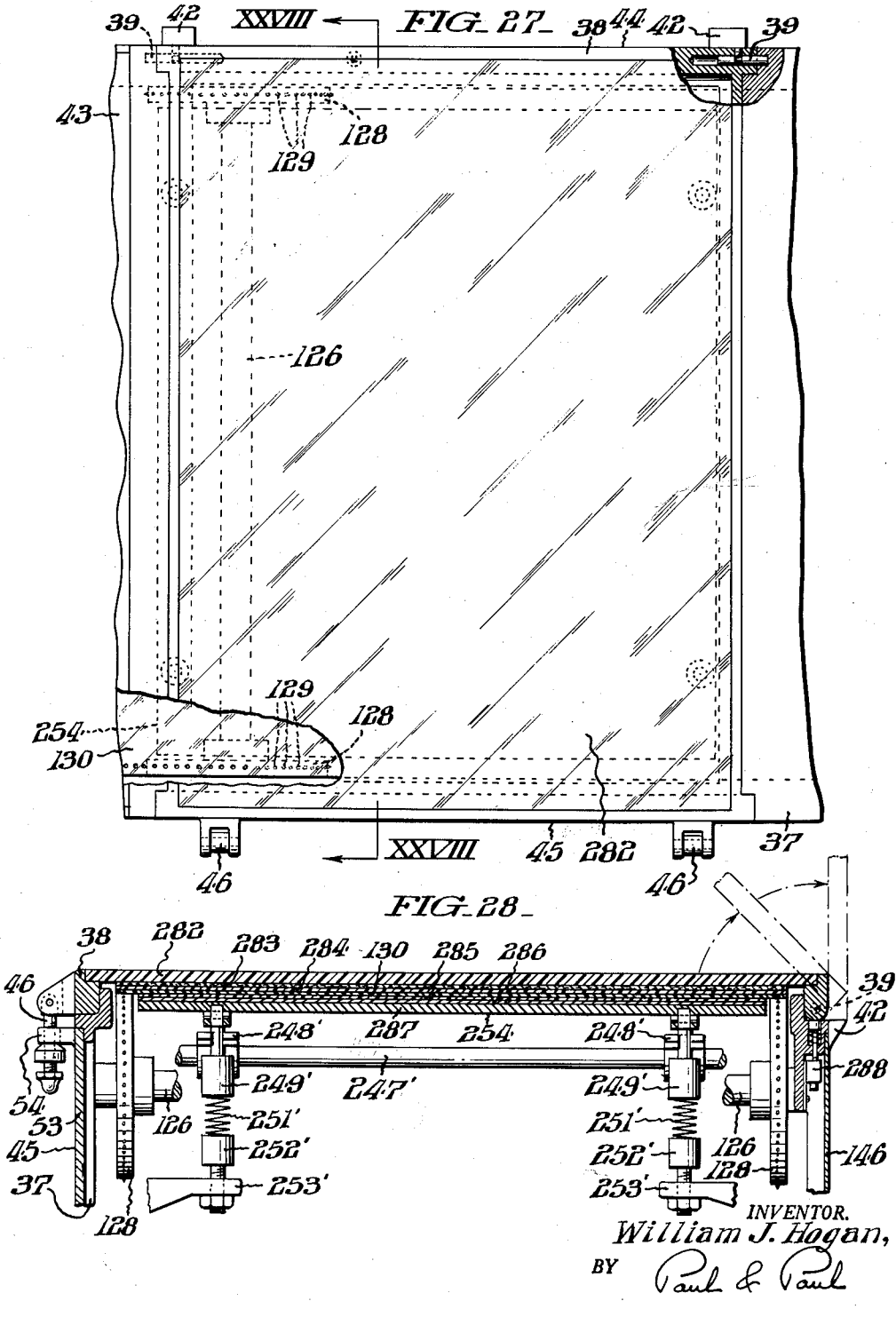

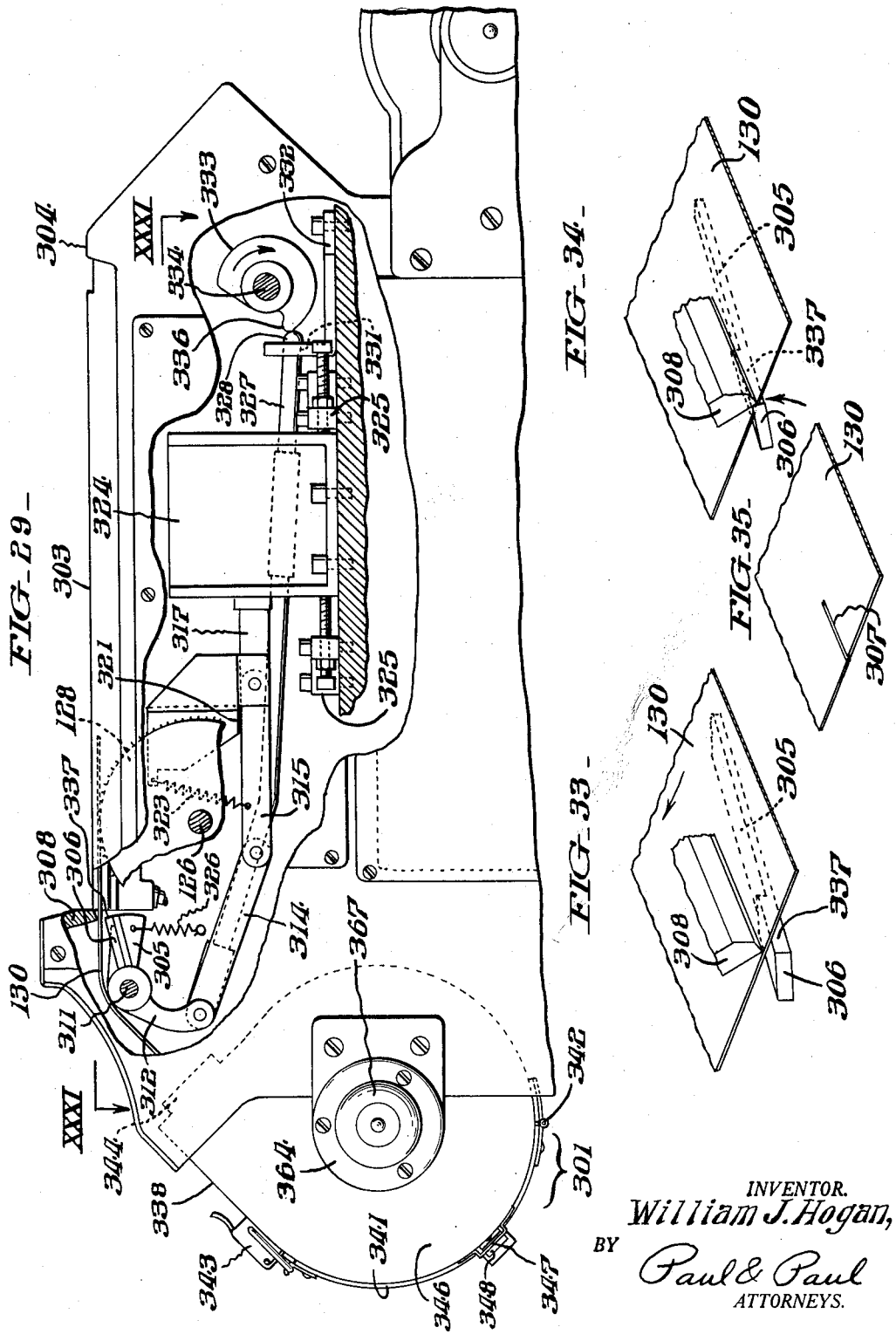

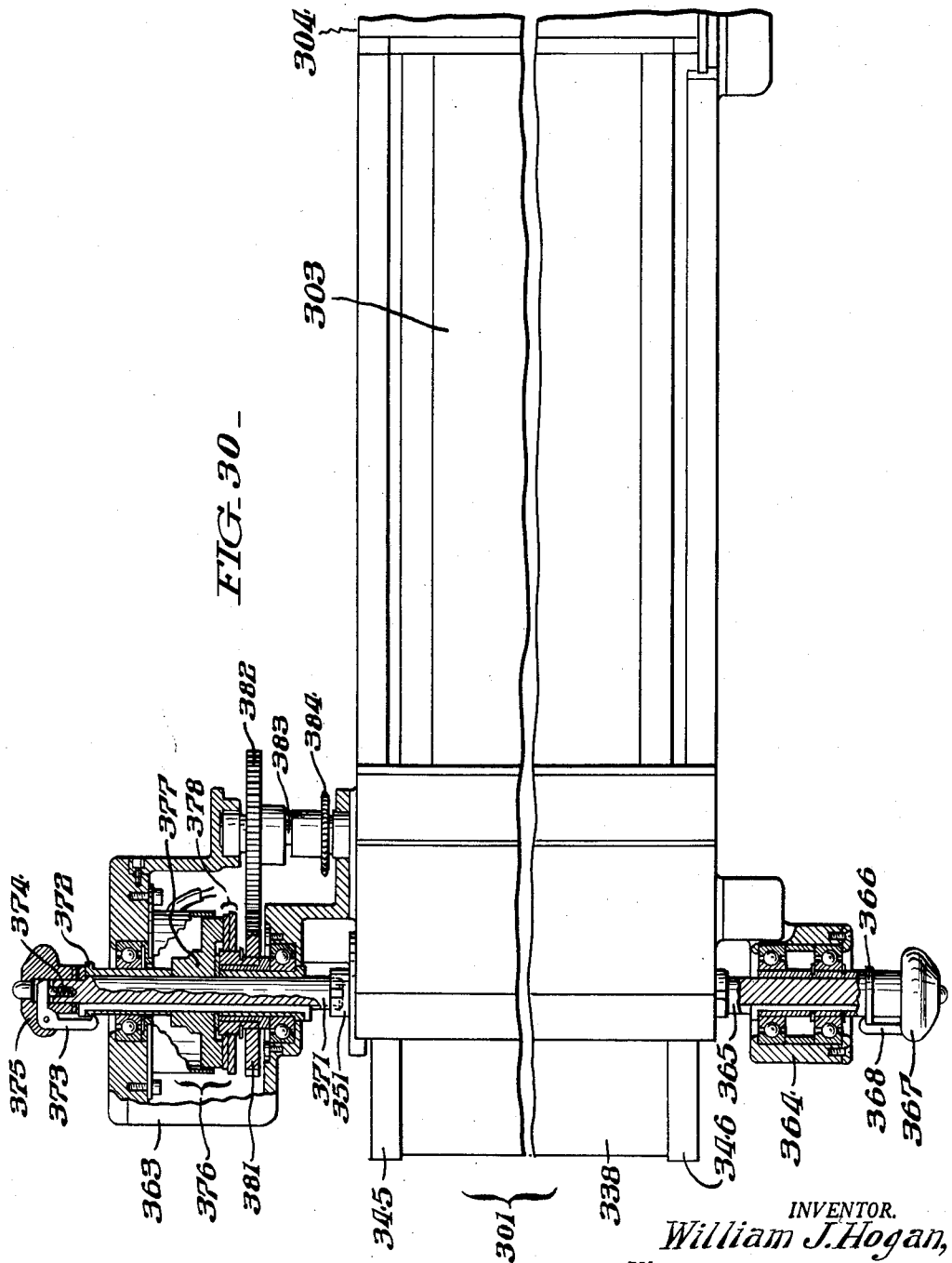

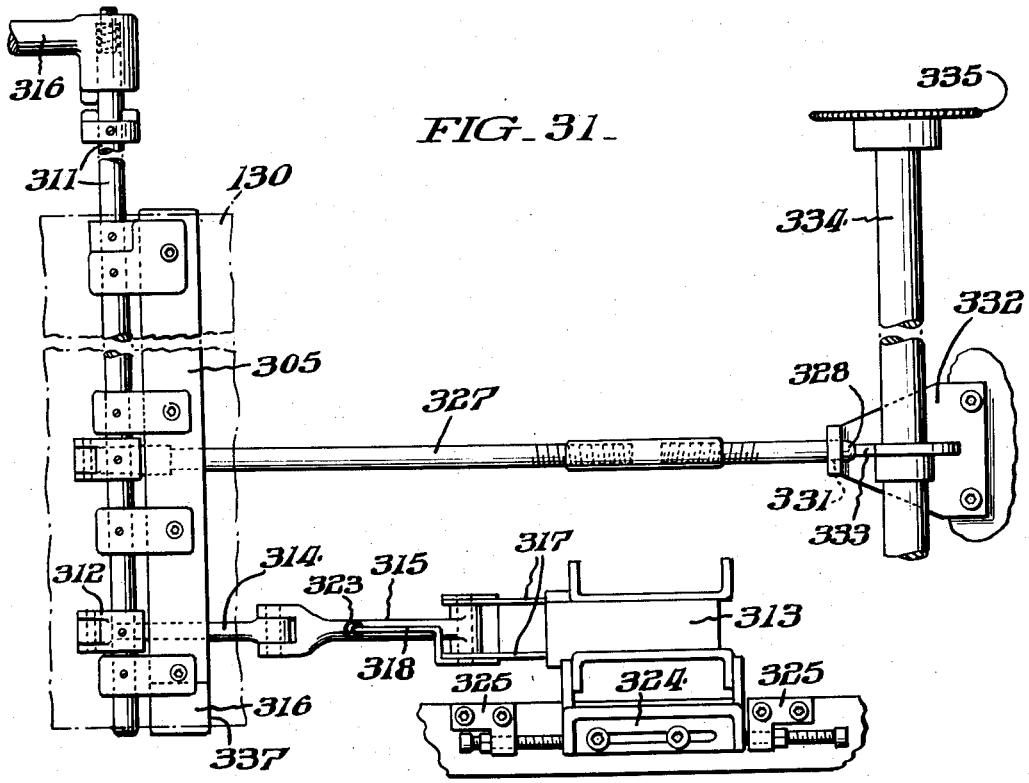
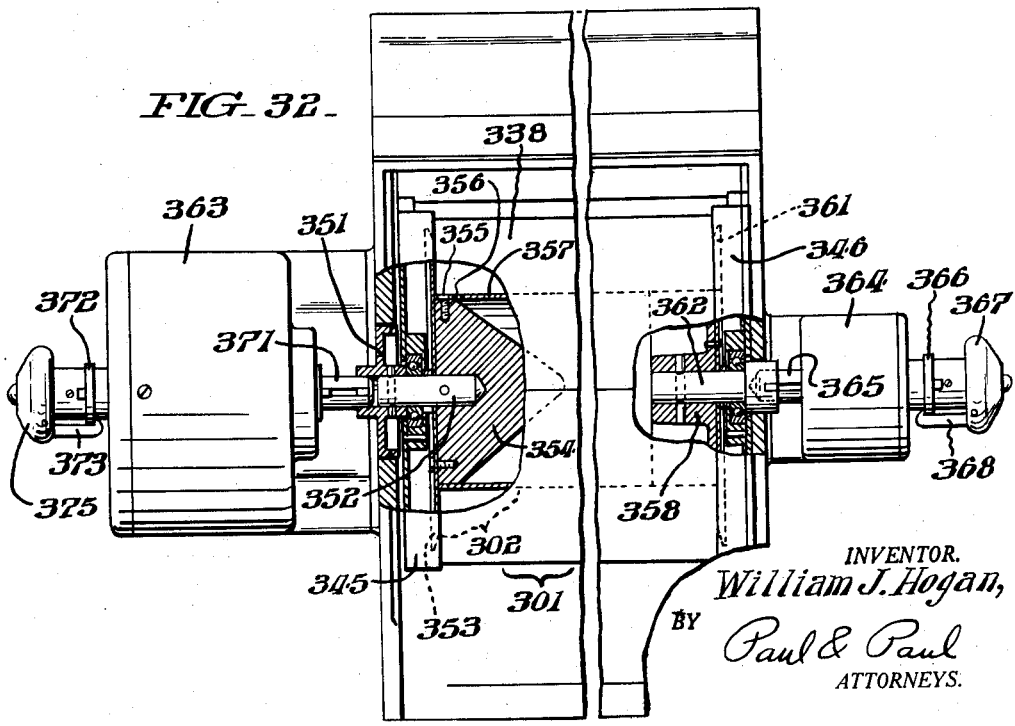

з,081,679
RAPID FILM CHANGING DEVICE
William J. Hogan, Philadelphia, Pa., assignor to Franklin X-ray Corporation, Philadelphia, Pa., a corporation of Pennsylvania
Filed June 6, 1958, Ser. No. 740,249
4 Claims. (Cl. 95—31)

This invention relates to photographic apparatus having a rapid film changing mechanism, and more particularly concerns X-ray radiographic apparatus for making a plurality of exposures in rapid succession.

Many attempts have heretofore been made to provide a rapid film changing device which can be used to take large numbers of pictures in rapid succession and in a minimum of time. Efforts along this line have been particularly emphasized by the medical profession, which desires to make X-ray radiographs in rapid succession. Such radiographs are of great medical value in that highly important and sometimes critical information may be obtained as to the functioning of vital organs, such as the heart, blood vessels, etc.

It has recently been discovered that important information can be obtained as to the structure and function of the human heart by admitting an opaque dye into the blood stream adjacent to the inlet to the heart, and by then making a rapid series of exposures on X-ray film, during the period when the dye is travelling through the heart, and through the passages adjacent to the heart. However, this fluid travels extremely rapidly through the area under study, and it is necessary to obtain a substantial number of exposures during the very short period of time available. Moreover, the film should be of considerable size, so that a full sized exposure will be obtained each time an exposure is made of the area.

It is accordingly an object of this invention to provide a rapid film changing device which has capacity to expose large numbers of films in rapid succession. Still another object of this invention is to provide an X-ray machine having a rapid film feeding and film changing mechanism, which may be used to expose several X-ray films per second.

Another object of this invention is to provide a rapid film changing device having a positive film drive means that eliminates slippage of the film, even when the movement of the film is rapidly started and stopped.

Another object of this invention is to provide an apparatus of this type having a novel film loading apparatus that is self-contained, removable, and portable.

A further object of this invention is to provide a rapid film changing device including a film cutting apparatus for cutting and delivering the exposed film.

Another object of this invention is to provide apparatus for indicating the ends of an exposed film frame and rolling it into a receiver magazine.

Another object is to provide apparatus for maintaining the roll of film taut in the receiver magazine.

A further object of this invention is to provide apparatus of this type including means for storing the exposed and cut film in consecutive order. Other objects and advantages of this invention will further become apparent hereinafter, and in the drawings, whereof:

FIG. 3 is an end view looking at the left side of FIG. 2;

FIG. 4 is an end view looking at the right side of FIG. 2;

FIG. 5 is a view similar to FIG. 2 on a larger scale, and showing details of the interior mechanism;

FIG. 6 is a plan view similar to FIG. 1 on a larger scale with parts broken away in order better to illustrate important details of the device;

FIG. 7 is a view of the rear of the device, with parts broken away in order better to illustrate further important details of the device;

FIG. 9 is a sectional view of the lower left end of the device, taken as indicated by the lines and arrows IX—IX which appear in FIG. 5;

FIG. 10 is a view of the upper right end of the device, taken as indicated by the lines and arrows X—X which appear in FIG. 5, with certain parts removed;

FIG. 11 is a view of the upper left end of the device, taken as indicated by the lines and arrows XI—XI which appear in FIG. 5, with certain parts removed;

FIG. 12 is a plan view of the exposed film container comprising a part of the rapid film changing device shown in the preceding figures;

FIG. 13 is a side view of the exposed film container, taken as indicated by the lines and arrows XII—XII which appear in FIG. 12;

FIG. 14 is a front view of the exposed film container, taken as indicated by the lines and arrows XIV—XIV which appear in FIG. 13;

FIG. 15 is a rear view of the exposed film container, taken as indicated by the lines and arrows XV—XV which appear in FIG. 13;

FIG. 16 is an enlarged sectional view of the upper left end of the device appearing in FIG. 5;

FIG. 17 is a view showing, in the non cutting position, the mechanism that controls the cutting of the film;

FIG. 18 is a view similar to FIG. 17 showing in the cutting position the mechanism that controls the cutting of the film;

FIG. 19 is a front view of the film supply container, partly in section;

FIG. 20 is a side view of the film supply container taken as indicated by the lines and arrows XX—XX which appear in FIG. 19, drawn to a larger scale and broken away in order better to illustrate the device;

FIG. 21 is a detail view in section taken as indicated by the lines and arrows XXI—XXI which appear in FIG. 20;

FIG. 22 is an enlarged view of the upper right end of the device appearing in FIG. 5, shown partly in section;

FIGS. 23 and 24 are diagrammatic views of the mechanism that controls the tension on the film;

FIGS. 25 and 26 are views showing certain parts of the device that control the movement of the pressure plate and the exposed film feed;

FIG. 27 is a plan view of the main cover portion of the device, partly broken away and shown in section;

FIG. 28 is a sectional view taken as indicated by the lines and arrows XXVIII—XXVIII which appear in FIG. 27;

FIG. 29 is a partial view in front elevation of another embodiment of the invention, with parts being broken away to illustrate important details;

FIG. 30 is a view in top plan and partly in section of the apparatus of FIG. 29;

FIG. 31 is a view in section taken as indicated by the lines and arrows XXXI—XXXI which appear in FIG. 29;

FIG. 32 is a view looking at the left end of FIG. 29, partly broken away and in section to illustrate important details; and FIGS. 33–35 are views illustrating the operation of notching the film at the ends of the exposed frame.

Figure 1:
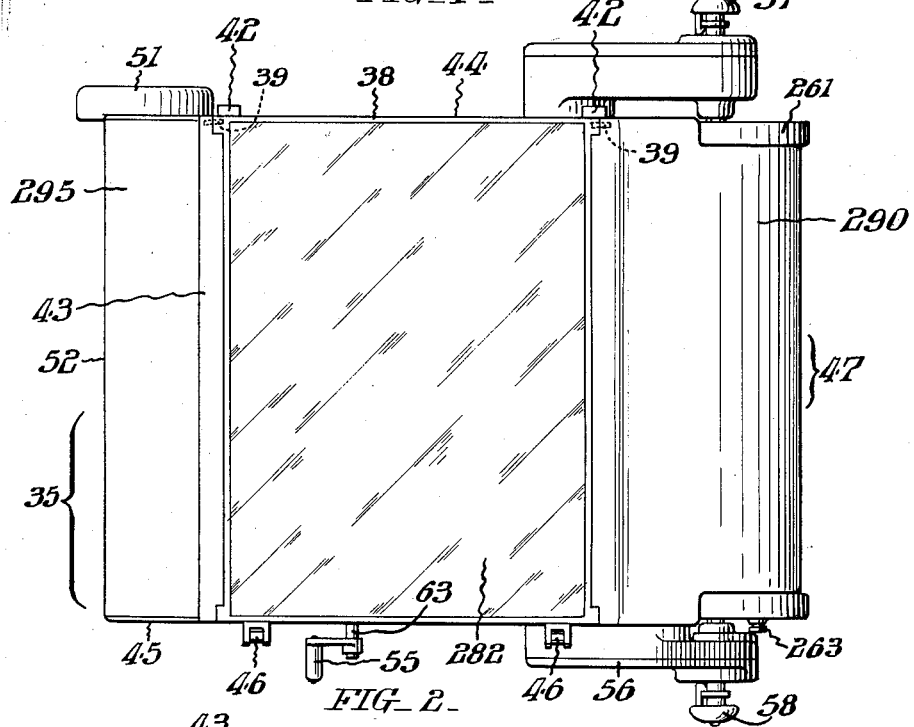
FIG. 1 is a plan view of one specific form of rapid film changing device embodying features of this invention.
Figure 2:
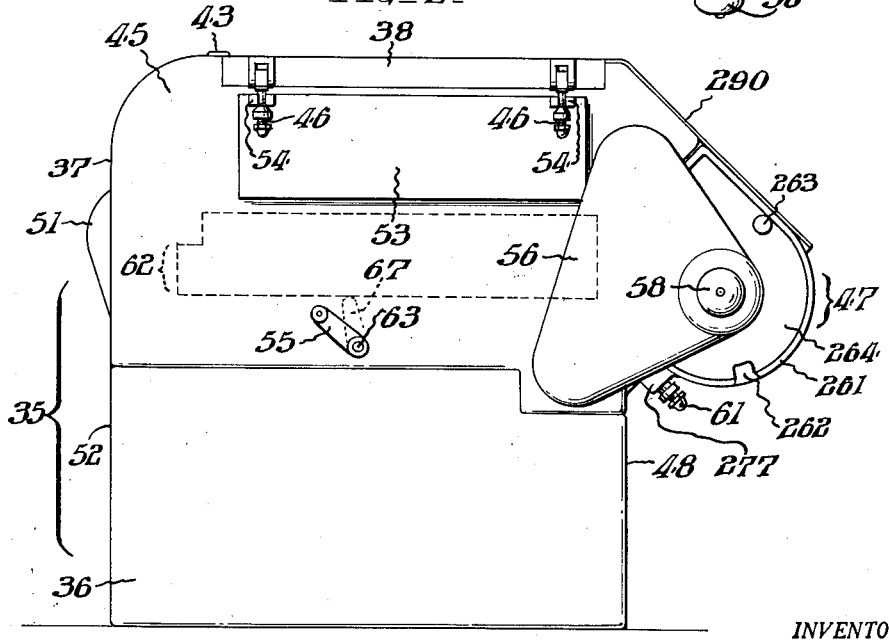
FIG. 2 is a front view of the device.

Turning now to the specific embodiments of the invention selected for illustration in the drawings, and referring more particularly to FIGS. 1–4, the number 35 designates generally a rapid film changing device including a lower portion 36 and an upper portion 37. A main cover 38 is provided which is hinged at 39. Stops 42 support main cover 38 in its open vertical position. Main cover 38 is mounted on the top 43 of the machine 35 and the stops 42 are affixed to back 44. At the front 45 of machine 35 the main cover 38 is provided with two main cover locking bolts 46 which serve to bolt the main cover 38 tightly in place. Removable film supply container 47 is mounted on the right side 48 and exposed film drive roller cover 51 can be seen projecting from the left side 52 of machine 35 (FIG. 2).

A removable front cover plate 53 is provided which has mounted thereon lugs 54 which receive main cover locking bolts 46. Exposed film container manual lock and support lever 55 appears on the front 45 of the machine as does sprocket cover plate 56. Film roll drive spindle 57 and film roll supporting spindle 58 are provided at each side of the removable film supply container 47 and removable film supply container locking bolts 61 are hingedly mounted on the right side 48 of the machine 35. An exposed film container 62 is partially supported by arms 67 on a rotatable support bar 63.

A rectangular opening 64 is provided about midway up left side 52 for easy insertion and removal of container 62 which slides on guides 65. Arms 67 extend from bar 63 to support the rear end of container 62.

Figure 8:
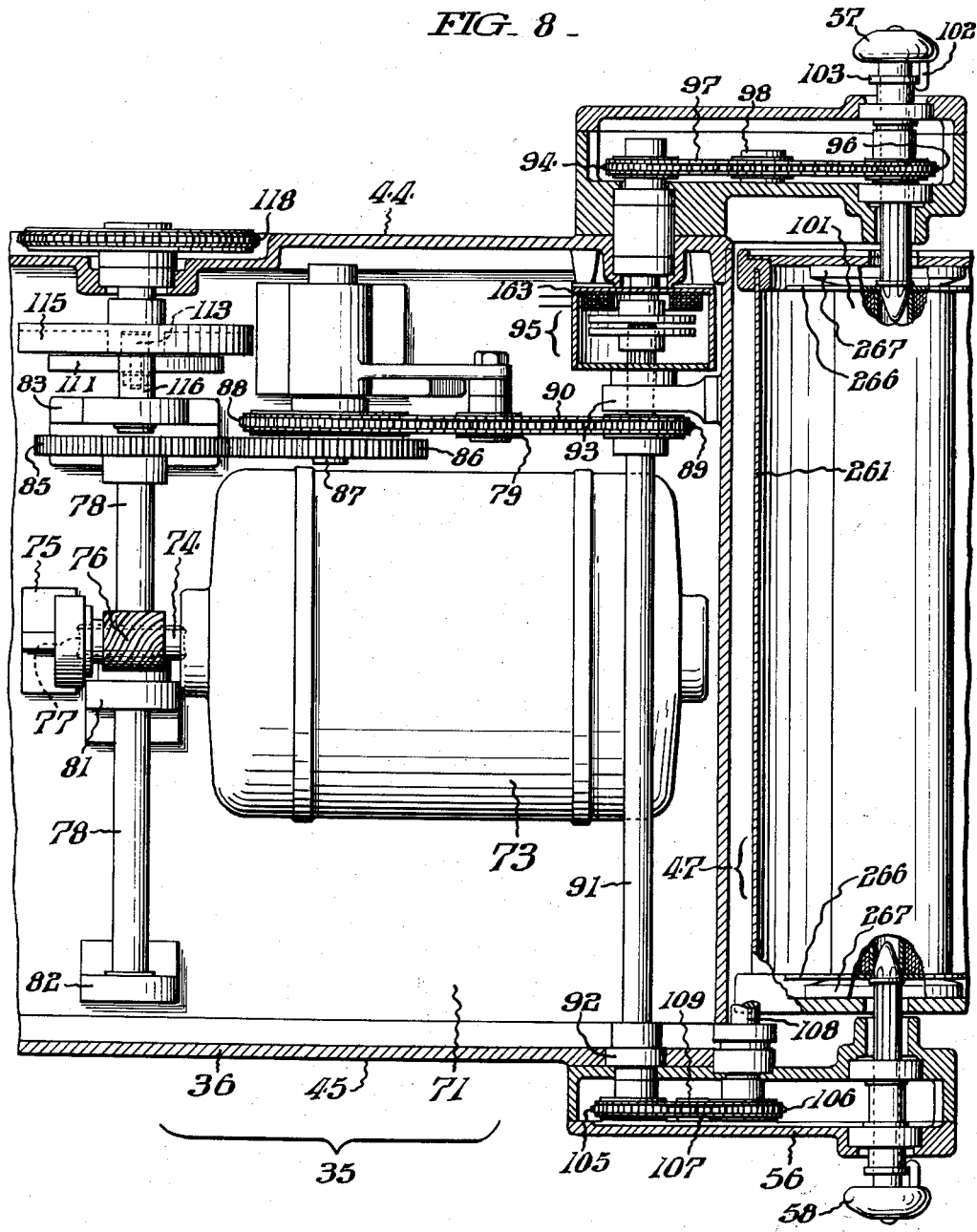
FIG. 8 is a sectional view taken as indicated by the lines and arrows VIII—VIII which appear in FIG. 5.

Turning now to FIGS. 5, 8, and 9, the number 71 indicates the floor of the machine and 72 the main drive motor support on which main drive motor 73 rests. Main drive motor shaft 74 is supported at its distal end by bearing 75. Shaft 74 has mounted thereon a worm gear 76 which drives a gear 77 mounted on a shaft 78 which rides in bearings contained within shaft supports 81, 82, 83 and the side of casting 84. A gear 85 is fixed to shaft 78 and meshes with a gear 86 which is connected by a shaft 87 to a sprocket 88 which is connected to a sprocket 89 by sprocket chain 90. A chain tightener 79 is provided to keep sprocket chain 90 at the proper tension. Sprocket 89 is mounted on a shaft 91 which is supported at one end by bearing 92 and at the other by bearing 93. Shaft 91 drives a sprocket 94 through a magnetic clutch 95 and sprocket 94 drives a sprocket 96 by sprocket chain 97. A chain tightener 98 is provided for sprocket chain 97 to maintain the proper tension. Sprocket 96 is mounted on the drive spindle 57 which drives a film roller 101. Spindle 57 is splined to the sprocket 96 and is held in engagement with film roller 101 by the latch 102 acting against a shoulder 103 of drive spindle 57. Supporting spindle 54 can likewise be withdrawn from engagement with film roller 101.

At the other end of shaft 91 is mounted another sprocket wheel 105 which drives sprocket 106 by means of chain 107. Sprocket 106 has a shaft 108 extending therefrom which operates the film cutting mechanism and also the pressure plate mechanism, as will further become apparent. A chain tightener 109 is provided for chain 107.

Also mounted on shaft 78 is a double crank arm 111 having rollers 112 and 113 bolted to each end and adapted to engage and ride within grooves 114 of wheel 115. Wheel 115 is mounted on shaft 116 which is supported in bearings in shaft support 83 and in side casting 117. Wheel 115 has four radial grooves 114 spaced ninety degrees apart. The action of rollers 112 and 113 riding within the grooves 114 impart an intermittent but gradual starting and stopping motion, or "Geneva" motion, to wheel 115 and shaft 116. Also mounted on shaft 116 is a sprocket 118 which drives another sprocket 125 and its shaft 126 through sprocket chain 127. Two pinwheels 128 are mounted on and driven by the shaft 126. The pins 129 of pinwheels 128 engage the edges of film 130 and move it into proper position.

An exposed film feed motor 131 is provided with a shaft 132 and a drive pulley 133 which through belt 134 constantly drives a pulley 135 mounted on a shaft 136. Exposed film rubber drive rollers 137 are mounted on shaft 136 and act to move the exposed film at the proper time.

FIG. 7 shows the back 44 of machine 35, with parts broken away for better illustration, and shows film drive spindle 57 and its associated sprocket 96, chain 97 and sprocket 94 as well as chain tightener 98. On the right side of FIG. 7 is shown pinwheel drive sprocket 125, sprocket chain 127 and associated chain tightener 145. Exposed film drive rollers 137, belt 134 and wheel 132 are shown. A back plate cover 146 is provided to cover an opening 147 in the back of the machine.

Turning now to FIGS. 23 and 24 which show schematically the film tension mechanism, the number 151 designates a metal film tension roller mounted on a shaft 152 the ends of which are rotatably supported in roller support rocker arm 153. Rocker arms 153 are rotatably affixed to a stationary shaft 154 anchored in the side of the casting at 156 and 157 (FIG. 10). Rocker arms 153 are spring-urged against the helical spring 158 which is anchored at one end to a collar 161 fixed to shaft 154. Film 130 rides on film tension roller 151 and during normal operation a switch mechanism 162 remains closed, energizing coil 163 of magnetic clutch 95 to engage the clutch plates and drive the film drive spindle 57. When, however, there is too much tension on film 130 the film tension roller 151, as shown in FIG. 24, moves downwardly against the action of spring 158 to open switch mechanism 162 and de-energize coil 163 of the magnetic clutch 95 to disengage film roller drive spindle 57, letting film 130 run free until such time as tension on film 130 has relaxed and switch 162 closes at which time clutch 95 again engages and operates to drive the film 130.

The right end of the film cutting mechanism shown in FIGS. 17 and 18 appears in FIG. 10, while the left end of the film cutting mechanism appears in FIG. 11. Referring then to those figures, shaft 108 is constantly driven by sprocket 106. A cam 164 is mounted on shaft 108. A rod 165 is provided having a stop collar 166, a rubber shock absorber 167, and a helical spring 168.

Rod 165 goes through a boss 170 on the frame 37 and spring 168 abuts boss 170, the other end of the spring abutting the stationary collar 171. The rod 165 ends in a fork 172 which slidably engages shaft 108 and has a shoulder 173 which contacts cam 164.

At the other end of rod 165 is provided a crank actuating arm 174 attached to a pivot 175 which operates crank arm 176 about shaft 178 to rotate cutting knife 181 into cutting relationship with knife edge 182 to cut the exposed film at 183. Shaft 178 is supported on arms 184 which are anchored to the side of the casting by means of bolt 185 and nut 186. Nut 186 is normally tightened down on bolt 185 to keep arms 184 in a fixed position but adjusting screws 187 in lugs 188 of the casting are provided to adjust the position of arm 184 so that cutting knife 181 meets knife edge 182 properly.

FIGS. 12, 13, 14, and 15 illustrate the exposed film container 62 which is hinged at 195 and has a lid 191 with three flanges 192, 193 and 194. Flanges 192, 193 and 194 cover sides 196, 197 and 198, respectively, of container 62. A side 201 is provided with a rectangularly shaped attachment 202 which forms a shoulder 203 to contact a shoulder 204 of machine 35 to aid in securely maintaining exposed film container 62 in operating position. Side 201 is also provided with a slot 205 for receiving the exposed film. As is shown more clearly in FIG. 16 this slot has a shutter 206 which is held in closed position by springs 207 suspended between posts 208, fixed to a support 211 which is part of the bottom of container 62, and posts 212 fixed to shutter 206. A fixed pin 213 is positioned in machine 35 so as to enter aperture 214 in the edge of exposed film container 62 to lower shutter 206 and open slot 205 to permit passage of film 130 into container 62. Film 130 enters slot 205 and strikes a curved baffle 215 which causes the cut film to rest in consecutive order upon a curved plate 216.

FIGS. 16, 25, and 26 show in detail the exposed film feed mechanism that transports the exposed film to exposed film container 62. The exposed film feed mechanism is correlated with the pressure plate mechanism, the exposed film cutting mechanism and the film drive mechanism. Referring then to FIGS. 25, 26, crank arm 221 is pivoted on a stud 222 fixed on a boss extending from the side casting of the machine. This crank arm 221 has a pivoted roller 223 which rolls about a cam 224 fixed to constantly rotating shaft 108. A rod 226 is pivoted to the end of crank arm 221 and is guided in the boss 170. The left end 228 of rod 226 is attached to a crank arm 231 by a spring 232. Crank arm 231 is pivoted about a shaft 233 and carries crank arms 234 which carry a shaft 235 on which rubber rollers 236 are pivotely connected. An exposed film safety switch 241 (FIG. 16) having a roller 242 is provided.

Rod 226 also has connected with it crank arms 245 and 245' pivotedly connected at 246 and 246'. The end of crank arms 245 and 245' rotate about fixed shafts 247 and 247' to rotate levers 248 and 248' which push rods 249 and 249' downwardly against the action of springs 251 and 251'. The other ends of springs 251 and 251' are set in bolts 252 and 252' held in fixed projections 253 and 253'. Rods 249 and 249' are attached to a pressure plate 254 and move it in and out of operating position.

FIGS. 19, 20, 21, and 22 show in detail removable film supply container 47 which has an enclosure 261 having flanges 262 at one edge which, together with latch 263, serve to hold cover plate 264 in place. The film roller 101 is inserted into container 47 and its side flanges 266 are contacted by light locks 267 which are preferably bellows made of rubber. The film is drawn through a flattened neck portion 268 of container 47 which contains a light lock 271. Light lock 271 has a bar 272 and a pivoted light lock trip lever 273 which rotates the light lock bar 272 away from the film 130 upon contacting flange 274 of machine 35 to permit passage of the film (FIGS. 20, 22). Light lock bar 272 is rotatably fixed to pivot pins 275 and acts against helical springs 276. Removable film supply container 47 is also provided with locking clevis-like lugs 277 adapted to receive locking bolts 61 to lock it into position. An exposed film container safety switch 281 (FIG. 22) is provided in the machine that normally contacts side 197 of container 62. If this contact is not made, safety switch 281 will open a circuit and prevent the machine from operating.

FIGS. 27 and 28 show in detail the main cover 38 and pressure plate 254. The top layer 282 of main cover 38 is preferably made of Bakelite, and the second layer 283 of felt. The third layer 284 is preferably a plastic intensifier screen. The film 130 contacts layer 284 and is securely held between main cover 38 and pressure plate 254. The first layer on the pressure plate 254 is a plastic intensifier screen 285. The second layer 286 of pressure plate 254 is of lead and these two layers 285, 286 are backed by the main body 287 of the pressure plate 254 itself. At the right of FIG. 28 is shown switch 288 which, when main cover 38 is at forty-five degrees with the top 43 of machine 35, opens a circuit to lower pressure plate 254. When main cover 38 is being closed, upon assuming a position forty-five degrees from horizontal, switch 287 closes to raise pressure plate 254.

Protection against the deleterious effects of the X-rays is provided by confining them within a lead enclosure defined by right side lead covers 290 and 291, bottom lead covers 292 and 293, and left side lead covers 294 and 295.

The operation of this apparatus is as follows:

Exposed film container 62 is inserted into rectangular opening 64 and is slid along guide 65. After container 62 is fully inserted, exposed film container manual lock and support lever 55 is rotated thereby turning bar 63 and arms 67 which push exposed film container 62 into a horizontal position and support it there. In this position, side 197 of container 62 contacts safety switch 281 to close the circuit and permit operation of the machine. When container 62 is moved into this horizontal position, fixed pin 213 enters aperture 241 in the edge of exposed film container 62 lowering shutter 206 and opening slot 205 to permit passage of film 130 into container 62.

In the meantime, removable film supply container 47 has been loaded with unexposed film and enclosure 261 has been covered by side cover plate 264. Bar 272 of light lock 271 contacts film 130 to keep the unexposed film isolated from light rays. This portable and self-contained film supply container 47 is then attached to the main portion of the machine. Pivoted light lock trip lever 273 contacts flange 274 of machine 35 rotating light lock bar 272 away from film 130 to permit passage of the film. Locking bolt 61 is tightened in lugs 277 to lock removable film supply container 47 into position. Main cover 38 is open at this time and the film 130 is pulled across pressure plate 254, which has been lowered by opening main cover 38, into contact with the pins 129 of pinwheels 128. Then the main cover 38 is closed and locked by main cover locking bolts 46. Now the apparatus is ready to take X-ray photographs.

When it is desired to make exposures in rapid succession, the machine is turned on and the main drive motor 73 starts to turn which drives gear 77 and gear 85. Gear 85 meshes with and drives gear 87 which in turn drives sprocket 88 and, through sprocket chain 90, sprocket 89. Sprocket 89 turns rod 91 which drives sprocket 94 through magnetic clutch 95. Sprocket 94 drives sprocket 96 through sprocket chain 97. It is sprocket 96, mounted on the drive spindle 57, which drives the film roller 101. Sprocket 89 rotates continuously, but sprocket 94 and spindle 57 operate intermittently according to the operation of the magnetic clutch 95 which engages to move the film 130 and disengages when the photograph is being taken.

At the other end of continuously driven shaft 91, sprocket 105 drives sprocket 106 by means of chain 107. Shaft 108 which extends from sprocket 106 operates the film cutting mechanism and the pressure plate mechanism. The operation of the film cutting mechanism is shown most clearly in FIGS. 17 and 18, FIG. 17 showing the cutting mechanism in a non-cutting position and FIG. 18 showing the mechanism in a cutting position. Shaft 108 has a cam 164 which rides against shoulder 173 of rod 165. When the cutting mechanism is in its non-cutting position cam 164 pushes rod 165 to the left against the action of spring 168. This rotates crank actuating arm 174 clockwise to rotate cutting knife 181 away from knife edge 182. When shaft 108 rotates a little farther, shoulder 173 slips into a depression in cam 164, and spring 168 acts to push rod 165 to the right. This rotates crank arm 176 counterclockwise to bring cutting knife 181 into cutting relationship with knife edge 182 to cut the exposed film at 183.

When the machine is turned on, exposed film feed motor 131 constantly drives pulley 135, shaft 136 and exposed film rubber drive rollers 137 through drive pulley 133 and belt 134. Constantly rotating shaft 108 has another cam 234 about which rolls a pivoted roller 223 mounted upon crank arm 221. Rod 226 is pivoted to the end of crank arm 221 and is guided in boss 170 while the left end 228 of 226 is attached to a crank arm by a spring 232. When cam 224 pushes rod 226 to the left against the action of tension spring 232, the roller 236 is moved away from roller 137 and the exposed film therebetween so that the exposed film has no force exerted against it to move it. When, however, roller 223 rides in the indented portion of cam 224, spring 232 pushes rod 226 to the right forcing roller 226 into close proximity with roller 137 to exert pressure on film 130 to move it into the exposed film container 62. This happens after the exposed film has been cut at 181.

The pressure plate mechanism also operates off rod 226 through crank arms 245 and 245′ which rotate levers 248 and 248′ to push the rods 249, 249′ downwardly against the action of springs 251 and 251′. This action raises and lowers pressure plate 254 in and out of operating position.

Rotation of shaft 78 rotates the double crank arm 111, reciprocating the rollers 112 and 113 within grooves 114 to impart a "Geneva" motion to wheel 115. This motion is, in turn, imparted to sprocket 125 through sprocket chain 127 to drive the pinwheels 128 that engage film 130. It will be apparent that the rollers 112, 113 cause the wheel 115 to undergo a cyclic intermittent rotary movement. In each cycle, the rotation of wheel 115 is started slowly, since the roller 112 or 113 is moving almost radially toward the shaft 116. As roller 112 or 113 continues to revolve about the shaft 78, its path becomes gradually more and more non-radial relative to the wheel 115, thereby rapidly accelerating the rotary movement of wheel 115. After rotation of wheel 115 for one-half quadrant, the movement of roller 112 or 113 is directed away from the shaft 116 and again gradually approaches a radial movement. Accordingly, wheel 115 gradually decelerates and eventually stops completely at the completion of rotation through one quadrant. The other roller 112 or 113 then engages the next successive radial groove 114 and repeats the cycle. The net result is that the sprocket 125 is cyclically started and stopped with a gradual, rapidly accelerating motion but without sudden jerking movement.

In taking the photographs, film 130 is stopped in position between main cover 38 and pressure plate 254 while the photograph is taken and then moved very rapidly away from this position, rapidly stopped and cut while the next section of film is positioned between main cover 38 and pressure plate 254 for the next photograph. This quick acting intermittent (yet gradual) motion is imparted to film 130 by the pinwheels 128. Pinwheels 128 are driven in this manner by sprocket 125, which has a "Geneva" motion as heretofore explained.

Although this invention has been described with reference to an X-ray apparatus, it will readily be appreciated that the invention is readily applicable to rapid film changing uses of other kinds. For example, ordinary photographic film may be exposed, using conventional photographic lenses and associated equipment, when it is desired to take a plurality of exposures rapidly in succession with one another. Moreover, although the invention has outstanding utility in the medical field, as heretofore described, it will be appreciated that it is also applicable to a wide variety of other fields wherein it is desired to take a plurality of pictures in rapid succession.

The apparatus in accordance with this invention has the particular advantage that, although the film is rapidly started and stopped, this is accomplished without any jerking movement. Because of the gradual, yet extremely rapid acceleration and deceleration provided by the "Geneva" movement which drives the film, exposures may be made in extremely rapid succession without damaging the film, throwing it out of alignment, or causing excessive wear of the moving parts of the apparatus. Using apparatus in accordance with this invention, it is readily possible to make as many as six exposures per second, or more, without adversely effecting the photographic quality of the exposures, and without harming the film or the rapid film changing apparatus. This is a highly desirable achievement, particularly in the medical field where it is desired to make X-ray photographs in rapid succession in order to provide information as to the structure and function of vital parts of the human body.

Turning now to FIGS. 29-35, there is shown an embodiment of the invention which differs from that hereinbefore discussed in that a notching mechanism is provided so that the film 130 is notched at the end of each exposed frame, instead of being cut. Further, a receiver magazine 301 is provided which winds the notched but uncut film about a power driven receiver spool 302.

Additionally, since film receiver spool 302 is power driven, the film supply spool is not. Other differences include the hinging of cover 303, which is hinged along an axis 304 that is transverse to the direction of film travel in order to eliminate any chance of moving and misaligning the film by closing the cover; the shape of cutting blade 305, which is curved so that the film 130 is cut with an action that is similar to a scissors action; and the notching end of blade 305, which is provided with a chip 306 that operates to make a notch 307 (FIG. 35) in the film, which notch is uniform in length even though the length of arc travelled by blade 305 be not always the same in performing the notching operation.

The notching mechanism includes a stationary upper knife blade 308 and a rotatable curved lower cutting blade 305. Blade 305 is rotatable about a shaft 311 and is rotated by an actuator 312 which moves in response to a solenoid 313 to which it is connected by pivoted links 134 and 315.

Blade 305 is also rotatable in response to the turning of a handle 316 which is mounted on one end of shaft 311. To cut the film, blade 305 is rotated through a larger arc distance than when it is merely notching the film. During this cutting operation, links 314 and 315 break downwardly, and a spring 323 brings links 314 and 315 back into their more nearly aligned position. Mounted on solenoid armature 317 is a bracket 318 which provides an upper stop 321 for link 315. Spring 323 is connected between bracket 318 and link 315.

Solenoid 313 is mounted on solenoid bracket 324 which is fixedly mounted to the frame of the machine and is provided with adjustment blocks 325.

The mechanism for returning blade 305 to its non-notching position includes a spring 326 which is attached between the blade 305 and the frame of the machine, and a push rod 327 which rotates shaft 311. Free end 328 of push rod 327 slidably engages within an aperture 331 in a fixedly mounted bracket 332. Free end 328 also engages a cam 333 which is rotatable in the direction shown by the arrow. Cam 333 is driven by time shaft 334 which is driven by sprocket 335 connected to the main drive. After the film has been notched, the indented face 336 of cam 333 strikes end 328 of push rod 327 to push the rod 327 forward and return blade 305 to its non-notching position. Upon the de-energizing of solenoid 313, spring 326 also performs this function of returning blade 305 to its non-notching position. The force of spring 326 is sufficient to perform this function without the help of push rod 327. Push rod 327 and its associated cam 333 are provided as a safety measure so that the operation of the machine does not depend on the satisfactory operation of a spring such as spring 326. It is of course to be realized that in using the apparatus of this invention to take X-ray pictures of a patient, it is of utmost importance that the apparatus be trouble free so that the patient does not have to have the X-ray pictures retaken because of failure of the machine.

To insure that notch 307 is of uniform length and to compensate for minor variations in the length of the arc that blade 305 passes through in notching the film, blade 305 is provided with the chip 306 as is shown most clearly in FIGS. 33 and 34. Chip 306 is of greater thickness than blade 305 and the edge of upper knife blade 308 may be positioned at any point along chip face 337 and still give a notch 307 of uniform length.

Referring more particularly to FIGS. 29 and 32, receiver magazine 301 includes a housing 338 having a door 341 which is provided with hinges 342 and catches 343, light lock 344 (through which the film is passed to enter magazine 301), a fixed end cap 345, and a removable end cap 346 which is provided with a catch 347 which receives a clip 348.

Receiver magazine 301 is also provided with a knob 351 which is pinned to rotatably supported shaft 352 on which is mounted receiver spool flange 353 and guide cone 354. Protruding from the cone 354 is the head of a screw 355 which is adapted to receive any one of a number of slots 356 formed in the edges of receiver spool barrel 357. In placing barrel 357 in proper relationship with flange 353, the cone 354 guides the entering barrel 357, and any one of a number of slots 356 may slide into position over the head of screw 355. At the other end of barrel 357 there is provided a spool plug 358 which is riveted to a spool flange 361 and pinned to a rotatably supported shaft 362.

Referring to FIGS. 30 and 32, projecting from the sides of the frame are receiver magazine supports 363 and 364. Projecting inwardly from support 364 is a spring-loaded retractable spindle 365 which meshes with spool shaft 362. Spindle 365 is provided with a retaining ring 366, knob 367, and retaining latch 368.

Receiver magazine support 363 has projecting inwardly therefrom a spring-loaded retractable spindle 371 which meshes with knob 351. Spindle 371 is provided with a retaining ring 372, retaining latch 373, spring 374, and knob 375. Also provided within receiver magazine support 363 is a magnetic clutch 376 having a clutch rotor 377 which is fixed to spindle 371 and a clutch armature 378 which is free to rotate about spindle 371. Armature 378 is driven by gear 381 which meshes with gear 382 on shaft 383. Sprocket 384 is also mounted on shaft 383 and sprocket 384 is driven from the main drive of the machine.

In the operation of the embodiment of the invention shown in FIGS. 29-35, the film is driven as before by the pin-wheels 128. To set up the apparatus the film is initially drawn through the light lock 344 of receiver magazine 301. The door 341 of magazine 301 is opened and the end of the film is taped to barrel 357 of receiver spool 302. Then the machine is ready for rapidly taking a series of exposed film frames. The film is stopped as before and held in position while the frame is being exposed. Then blade 305 is actuated to notch the end of the frame and the film is shot into receiver magazine 301 by the driving action of pinwheels 128. Pinwheels 128 are actuated by the "Geneva" drive and the pinwheels 128 impart varying velocities to the film. After the notching has been accomplished, the blade 305 is returned to its non-notching position through the action of spring 326 and the action of push rod 327 which is operated by cam 333. Blade 305 had been actuated when solenoid 313 was energized to pull the linkages 314 and 315 toward the right in FIG. 29. Upon solenoid 313 being de-energized, the force of spring 326 is sufficient to bring the blade 305 back into non-notching position, and the impact of cam 333 pushes push bar 327 to insure that the blade 305 is positively returned to its non-notching position. After the desired number of frames have been exposed, the film is cut by operating handle 316 and all of the exposed film frames are rolled into receiver magazine 301 which retains the exposed film frames in complete darkness. Magazine 301 is then removed from the machine and unloaded in the darkroom, and another receiver magazine may be inserted in the machine if desired. This provides for uninterrupted use of the machine.

In the dark room the exposed film frames are removed from magazine 301 by removing cap 346. Removal of cap 346 also removes flange 361 and plug 358. This leaves barrel 357 and flange 353 still within the magazine. This next step is to remove barrel 357 by pulling it off cone 354. A new barrel may then be inserted into the magazine and guided into its proper position by cone 354.

It is to be noted that magnetic clutch compensates for the different velocities of the film as it enters receiver magazine 301 and winds about receiver spool 302. At times the receiver spool 302 rotates at a speed slower than the speed of the incoming film. At other times the spool would rotate at a speed faster than the speed of the incoming film were it not for the slipping of the magnetic clutch 376. When the film is taut about the receiver spool 302, the clutch slips until the release of the next exposed film frame drives the exposed film frame into the magazine 301 at great speed. At this time the clutch rotation is no longer opposed and it rotates the receiver spool 302 to wind the film.

The notches in the film are of advantage in that they provide a clear indication as to where the exposed film frames are to be cut into separate frames in the darkroom. The exposed roll might be developed uncut, but this creates problems, especially problems in hanging and drying the developed film since each frame is approximately 18 inches in length. The machine using roll film and notching each frame has a larger capacity than the machine which cuts each frame, the former using a 75 foot roll which gives about 80 exposed film frames.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. In a photographic apparatus; means for holding a supply roll of unexposed film; motor drive means, including an intermittent Geneva movement, for advancing said unexposed film through an exposure station in an intermittent cyclic movement characterized by a motion period and a momentary stop period; means for exposing said film during a stop period; shearing means, connected to said motor drive means, for automatically cutting a transverse notch at the edge of said film during the stop period next following exposure of a frame, for marking the end of said frame; a removable magazine for receiving said exposed notched film; means, including a magnetic clutch connected for driving a wind-up spool rotationally for winding up said exposed notched film; and manually operable means for completely severing said film after a selectable number of successive frames have been exposed and notched.

2. In a photographic apparatus; means for holding a supply roll of unexposed film; motor drive means, including an intermittent Geneva movement, for advancing said unexposed film through an exposure station in an intermittent cyclic movement characterized by a motion period and a stop period; means for exposing said film during a stop period; means, including a fixed knife blade and a second blade, the latter pivotable about an axis transverse to said film and connected to said motor drive means, for automatically shearing a transverse notch at the edge of said film for marking the limit of an exposure frame; a removable magazine for receiving said exposed notched film; means, including a magnetic clutch connected to said motor drive means, for driving a wind-up spool rotationally for winding up said exposed notched film; and manually operable means for severing said film after a selectable number of successive frames have been exposed and notched.

3. A variable speed film changer for rapidly obtaining a plurality of exposed frames of film, comprising an enclosure having means for exposing the film; drive means for moving the film into position for exposure and for moving the exposed film away from the exposure position; cutting means for indicating the ends of a frame of exposed film; and receiver means for receiving the frames of exposed film, said cutting means comprising a notching blade for notching an end of the film frame, solenoid operated linkage connected to the notching blade for actuating the blade, and blade return means including a cam-operated push bar connected to the blade for returning the blade to its non-notching position.

4. A variable speed film changer for rapidly obtaining a plurality of exposed frames of film, comprising an enclosure having means for exposing the film; drive means for moving the film into position for exposure and for moving the exposed film away from the exposure position; cutting means for indicating the ends of a frame of exposed film; and receiver means for receiving the frames of exposed film, said receiver means comprising a receiver magazine having a housing with a light-lock opening, a receiver spool rotatably mounted within the receiver magazine, the end of the film being attachable to said spool, and spool drive means for rotating said spool and winding said film thereon, said spool drive means including magnetic clutch means so adjusted that when the film is tight on the spool, the clutch slips.

References Cited in the file of this patent

UNITED STATES PATENTS

| | | |
|---|---|---|
| 1,992,091 | Petit | Feb. 19, 1935 |
| 2,043,004 | Lloyd et al. | June 2, 1936 |
| 2,082,232 | Traenkle | June 1, 1937 |
| 2,173,831 | Eitzen | Sept. 26, 1939 |
| 2,388,423 | Langdon | Nov. 6, 1945 |
| 2,474,159 | Pejois | June 21, 1949 |
| 2,533,099 | Earhart | Dec. 5, 1950 |
| 2,652,744 | Goldberg | Sept. 22, 1953 |
| 2,673,500 | Cassidy et al. | Mar. 30, 1954 |
| 2,782,678 | Taylor | Feb. 26, 1957 |
| 2,796,009 | Doyle et al. | June 18, 1957 |

FOREIGN PATENTS

| | | |
|---|---|---|
| 732,402 | Great Britain | June 22, 1955 |
| 782,236 | Great Britain | Sept. 4, 1957 |